US012615234B2

(12) United States Patent
Axer et al.

(10) Patent No.: US 12,615,234 B2
(45) Date of Patent: Apr. 28, 2026

(54) APPARATUS INCLUDING A TRANSCEIVER

(71) Applicant: NXP B.V., Eindhoven (NL)

(72) Inventors: Philip Axer, Hamburg (DE); Christian Herber, Hamburg (DE)

(73) Assignee: NXP B.V., Eindhoven (NL)

( * ) Notice: Subject to any disclaimer, the term of this patent is extended or adjusted under 35 U.S.C. 154(b) by 504 days.

(21) Appl. No.: 18/166,556

(22) Filed: Feb. 9, 2023

(65) Prior Publication Data

US 2023/0262028 A1    Aug. 17, 2023

(30) Foreign Application Priority Data

Feb. 16, 2022    (EP) ..................................... 22156975

(51) Int. Cl.
| | |
|---|---|
| *H04L 9/00* | (2022.01) |
| *H04B 1/16* | (2006.01) |
| *H04B 1/40* | (2015.01) |
| *H04L 9/06* | (2006.01) |
| *H04L 9/40* | (2022.01) |
| *H04L 69/06* | (2022.01) |
| *H04L 69/22* | (2022.01) |

(52) U.S. Cl.
CPC ........... *H04L 63/0236* (2013.01); *H04B 1/16* (2013.01); *H04L 63/04* (2013.01); *H04L 63/123* (2013.01)

(58) Field of Classification Search
CPC ... H04L 63/0236; H04L 63/04; H04L 63/123; H04L 69/22; H04L 69/06; H04B 1/16; H04B 1/40
See application file for complete search history.

(56) References Cited

U.S. PATENT DOCUMENTS

| | | | | |
|---|---|---|---|---|
| 6,708,218 B1 * | 3/2004 | Ellington, Jr. | ...... | H04L 63/0272 |
| | | | | 709/239 |
| 7,853,691 B2 * | 12/2010 | Elzur | ...................... | H04L 69/08 |
| | | | | 709/236 |
| 8,908,510 B2 | 12/2014 | Sela et al. | | |
| 2008/0123652 A1 * | 5/2008 | Akyol | ................... | H04L 12/465 |
| | | | | 370/392 |

(Continued)

OTHER PUBLICATIONS

"IEEE P802.1AE/D3.1 Draft Standard for Local and Metropolitan Area Networks: Media Access Control (MAC) Security", 802-lae-d3-1, IEEE Draft, May 4, 2005, pp. 1-140, 802-1AE-D3-1, vol. 802.1, IEEE, Piscataway, NJ, USA.

(Continued)

*Primary Examiner* — Vu V Tran

(57) ABSTRACT

An apparatus comprising: an input for receiving a stream comprising a plurality of data transmission units; a filter configured to identify, in the stream, at least one data transmission unit having control data of a predetermined type and remove said control data to generate a second stream; a protocol module configured to receive said second stream and identify, in the second stream, at least one data transmission unit of a predetermined type and add protocol information to the at least one data transmission unit; and wherein the removal of said control data provides time in said second stream for the addition of the protocol information; and wherein the apparatus includes a transceiver configured to output signals representative of said data transmission units of the second stream with said protocol information added to a transmission medium.

20 Claims, 3 Drawing Sheets

(56)                    References Cited

U.S. PATENT DOCUMENTS

| 2023/0291664 | A1 | 9/2023 | Axer et al. |
| 2023/0291748 | A1 | 9/2023 | Axer et al. |

OTHER PUBLICATIONS

IEEE 802.1 Qbb Draft Standard for Local and Metropolitan Area Networks: "Media Access Control (MAC) Bridges and Virtual Bridged Local Area Networks- Amendment 17: Priority Based Flow Control", IEEE Draft, 2011.

IEEE Computer Society; IEEE Standards for Local and Metropolitan Area Networks: Supplements to Carrier Sense Multiple Access with Collision Detection (CSMA/CD) Access Method and Physical Layer Specification—Specification for 802.3 Full Duplex Operation and Physical Layer Specification for 100 Mb/s Operation on Two Pairs of Category 3 or Better Balanced Twisted Pair Cable (100BASE-T2); 325 pages (Sep. 5, 1997).

\* cited by examiner

APPARATUS INCLUDING A TRANSCEIVER

CROSS-REFERENCE TO RELATED APPLICATIONS

This application claims the priority under 35 U.S.C. § 119 of European patent application no. 22156975.9, filed Feb. 16, 2022 the contents of which are incorporated by reference herein.

FIELD

The present disclosure relates to an apparatus including a transceiver. In particular, the disclosure relates to an apparatus configured to remove control data from one or more data transmission units to make way for protocol information. It also relates to an associated method and a computer readable medium and computer program

BACKGROUND

Transceivers, which are typically part of physical layer, PHY, modules may be provided in an apparatus along with modules that provide other functionality. The other functionality may comprise security functionality, such as the provision of data confidentiality, data authenticity, or data integrity functions.

SUMMARY

According to a first aspect of the present disclosure there is provided an apparatus comprising:
  a. an input for receiving a stream comprising a plurality of data transmission units;
  b. a filter configured to identify, in the stream, at least one data transmission unit having control data of a predetermined type and wherein said apparatus is configured to at least remove said control data of the predetermined type from the identified at least one data transmission unit and thereby generate a second stream of data transmission units comprising said first stream with the control data of the predetermined type removed;
  c. a protocol module configured to receive said second stream and identify, in the second stream, at least one data transmission unit of a predetermined type and add protocol information to the at least one data transmission unit of the predetermined type; and
  d. wherein the apparatus being configured to remove said control data of the predetermined type from said identified at least one data transmission unit provides time in said second stream for the addition of the protocol information; and
  e. wherein the apparatus includes a transceiver configured to output signals representative of said data transmission units of the second stream with said protocol information added to a transmission medium.

In one or more embodiments, said control data of predetermined type comprises a header of predetermined type.

In one or more embodiments, said apparatus is configured to remove said control data of the predetermined type from the identified at least one data transmission unit and increase a time gap between the identified at least one data transmission unit and an adjacent data transmission unit in the stream.

In one or more embodiments, the apparatus is configured to read information from the control data of the predetermined type prior to its removal, and provide said information to the protocol module, wherein said protocol module is configured to one or both of: use the information to determine the protocol information added to the at least one data transmission unit of the predetermined type; and identify the data transmission unit of the predetermined type.

In one or more embodiments, the control data of the predetermined type has a minimum size greater than or equal to the size of the protocol information added by the protocol module.

In one or more embodiments, the at least one data transmission unit of the predetermined type comprises said at least one data transmission unit from which the apparatus has removed the control data of the predetermined type.

In one or more embodiments, said protocol module comprises a security protocol module and said protocol information added to the data transmission unit of the second predetermined type comprises security protocol information.

In one or more embodiments, said protocol module is configured to implement, at least in part, the MACSec security protocol, and wherein the security protocol information comprises one or more of: a MACSec header and an integrity check value.

In one or more embodiments, said the apparatus is configured to read information from the from the control data of the predetermined type prior to its removal and wherein, for control of the implementation of MACsec by the protocol module, said information defines one or more of the following:
  a) specification of whether a controlled port or an uncontrolled port should be used by the protocol module;
  b) specification of which of a plurality of secure channels to use.

In one or more embodiments, said filter is configured to identify the header of predetermined type as such based on an EtherType field present in the data transmission unit.

In one or more examples, said filter is configured to, for data transmission units not having said control data or header of the predetermined type, provide said data transmission units to the transceiver for transmission bypassing said protocol module.

In one or more examples, the apparatus is configured to receive the stream at a predetermined rate and the transceiver is configured to transmit said signals at the output at the predetermined rate.

In one or more embodiments, the apparatus of the first aspect is provided in combination with a processor, wherein:
  a. the processor is configured to generate a plurality of said data transmission units for the stream, wherein the processor is configured to generate, for each of the data transmission units of the predetermined type, at least one data transmission unit having the control data of the predetermined type for removal by the filter;
  b. wherein the controller is configured to provide said plurality of said data transmission units to a media access controller for adding information to said data transmission units before providing the stream of data transmission units for the apparatus.

In one or more embodiments, the media access controller is configured to receive said plurality of said data transmission units from the controller and add to said data transmission units at least one of: a preamble, a start-of-frame delimiter, a frame check sequence and at least a predetermined time-space, comprising an interpacket gap, between each data transmission unit.

In one or more examples, the apparatus may be provided in combination with said processor and said media access controller.

In one or more embodiments, said apparatus is configured to receive data transmission units of the predetermined type followed directly in the stream by at least one data transmission unit having said control data of the predetermined type.

In one or more embodiments, the apparatus comprises an integrated circuit including said transceiver module, and the processor comprises a processor configured to control a media access controller that provides the stream to the apparatus.

According to a second aspect of the disclosure, we provide a method comprising:

a. receiving, at an input, a stream comprising a plurality of data transmission units;

b. identifying, by a filter, at least one data transmission unit in the stream having control data of a predetermined type and removing said control data of the predetermined type from the identified at least one data transmission unit and thereby generating a second stream of data transmission units comprising said first stream with the control data of the predetermined type removed;

c. receiving said second stream, by a protocol module, and identifying, in the second stream, at least one data transmission unit of a predetermined type and adding protocol information to the at least one data transmission unit of the predetermined type; and d. wherein removing of said control data of the predetermined type from said identified at least one data transmission unit provides time in said second stream for the addition of the protocol information; and e. outputting, by a transceiver, signals representative of said data transmission units of the second stream, with said protocol information added, to a transmission medium.

In one or more embodiments, the method includes, prior to said receiving by the apparatus:

a. generating, by a processor, a plurality of said data transmission units for the stream, wherein for each of the data transmission units of the predetermined type, at least one data transmission unit having the control data of the predetermined type is generated for subsequent removal by the filter; and b. providing said plurality of said data transmission units to a media access controller for adding information to said data transmission units before providing the stream of data transmission units for the apparatus.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A transceiver is configured to transmit signals over a transmission medium and, in one or more examples, receive signals from the transmission medium. It will be known to those skilled in the art that a transceiver may be part of a physical layer module or PHY. The PHY module may be provided as an integrated circuit and may provide an interface between "other devices" and the transmission medium. The PHY module may implement physical layer functions with reference to the known OSI model, and as such may be configured to generate signals based on the data transmission units it receives according to a protocol, the signals having one or more of an appropriate rate, voltage, and line code. The "other devices" may implement data link layer functions or higher level functions of the OSI model. The transmission medium may comprise a cable, an optical fibre or air in the case of wireless transmission.

In some examples, the transceiver or PHY module may be part of an apparatus, such as an integrated circuit, that also provides for, at least in part, other protocol functions. The other protocol functions may include security protocol based functions, such as data confidentiality and data integrity or non-security related functions. In one or more examples, it may be challenging to implement the other protocol functions due to limitations in the functionality of one or more components of the apparatus and/or the functionality of the other devices configured to provide data to the apparatus and/or limitations in the control signals that may be provided to the apparatus and/or due to rules any one or more of the apparatus or other devices are expected to implement.

Figure 1:
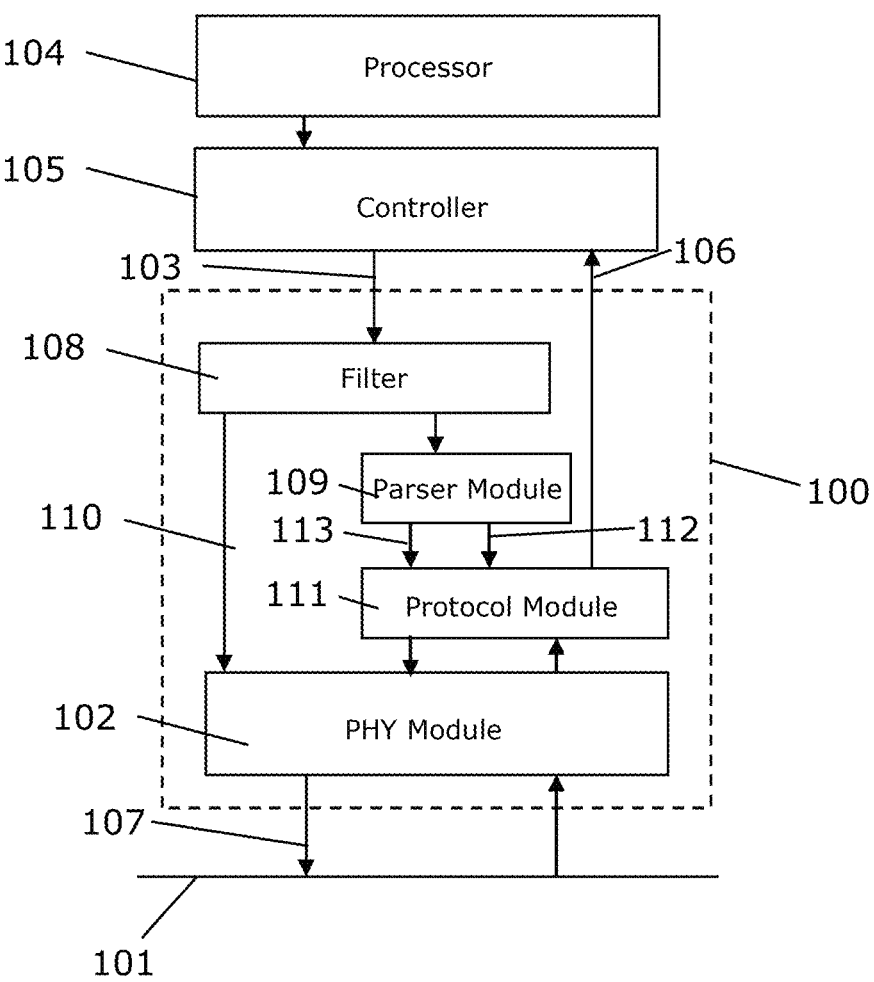
FIG. 1 shows an example embodiment of an apparatus according to the disclosure as well as a processor and media access controller.

FIG. 1 shows an example apparatus 100 according to the disclosure. The apparatus 100 may comprise an integrated circuit and may be configured to be coupled to a transmission medium 101 (shown generally as a line but could comprise an antenna-air interface). The apparatus 100 may be considered a transceiver and, accordingly, may include a PHY module 102 that provides the physical layer functionality. The apparatus 100 may be configured to receive data at input 103 from a processor 104 and a controller 105 and provide for transmission of signals over the transmission medium 101 based on said data. In other examples, the controller 105 is not present and the apparatus receives data from the processor 104. In one or more examples, the apparatus 100 may be configured to receive signals from the transmission medium and provide data based on said signals to the controller 104 at a receive output 106.

In one or more examples described herein, the apparatus 100 and processor 104 described may implement Ethernet protocols. The controller 105 may comprise a Media Access Controller or "MAC". Some Ethernet protocols, such as Ethernet security protocols, may be implemented, at least in part, by the apparatus 100 that includes the PHY module 102.

MACsec comprises an example of an Ethernet security protocol or standard. IEEE 802.1AE defines MACsec which comprises a network security standard that operates at a medium access control layer. As will be known to those skilled in the art, MACsec may define connectionless data confidentiality and integrity rules and processes for media access independent protocols. It will be appreciated however that other protocols, whether security related or not, may be implemented at least in part, or in full, by the apparatus 100.

The apparatus 100 comprises the input 103 for receiving a stream of data transmission units, such as frames or packets, from the processor 104, which may be received via the MAC 105. The media access controller 105 may be configured to receive said plurality of said data transmission units from the controller 104 and provide for addition, to said data transmission units, of one or more of: a preamble, a start-of-frame delimiter, a frame check sequence (such as a Cyclic Redundancy Check code) and at least a predetermined time-space between each data transmission unit, sometimes known as an inter-packet gap or inter frame space.

The input 103, due to its coupling to the MAC 105, may comprise a media independent interface, known in the art as xMII. In general, the apparatus 100 and, more specifically, the PHY module 102 provides for physical layer processing of the stream of data transmission units and provides for transmission, at an output 107, of signals that represent the stream of data transmission units on or to the transmission medium 101. The output 107 may comprise a media dependent interface, known as MDI, of the PHY module 102 of the apparatus 100.

The apparatus 100 or at least the PHY module 102 thereof, may be configured to receive data at a line rate speed and transmit the signals to the transmission medium 101 at the same line rate speed. Accordingly, the apparatus 100 may be configured to perform its processing on-the-fly at line rate speed. In some examples, the fundamental implication of this is that the PHY module 102 cannot increase the size of a data transmission unit or frame that enters the xMII 103 and is destined to the MDI 107. However, the implementation of protocols in the apparatus 100 typically requires data, such as headers and other (e.g. security) information to be added to data transmission units passing through the apparatus 100. Thus, it is a challenge to find enough time spacing between consecutive frames to add the information required to implement the protocols, such as security protocols in the apparatus 100.

In the present example embodiment, the apparatus 100 includes a filter 108. The filter 108 is configured to identify particular data transmission units from the stream of data transmission units received at the input 103 and selectively provide them to a parser module 109.

The filter 108 is configured to identify, in the stream, at least one data transmission unit having control data of a predetermined type. In the examples described herein the control data of predetermined type comprises a header of predetermined type and will be described as such hereafter. However, it will be appreciated that the principles disclosed could use other control data, alternative to or in addition to said header. For example, the filter 108 may identify control data provided contiguously in said data transmission unit or control data that is distributed over a plurality of fields of the data transmission unit, or over a plurality of data transmission units.

Thus, returning to the present example, the apparatus 100 may include a memory storing a look-up table or predetermined information that is for identifying the header of predetermined type. In some examples, the information identifying the header of predetermined type may be user-configurable. The filter 101 may thus check each data transmission unit for the header of predetermined type.

In the present example, that implements Ethernet based protocols, the header of predetermined type may comprise an EtherType header. Accordingly, the filter module 108 may be configured to identify the header of predetermined type by looking for the EtherType field present in the data transmission unit. The use of the EtherType field, which typically comprises a two-octet field in an Ethernet frame, may provide a means for identifying the data transmission units by the filter 108 without requiring other components to be reconfigured to account for its presence. It will be appreciated that other fields of the data transmission units may be used to allow the filter module 108 to identify which data transmission units should be passed to the parser module 109. For example, the filter module 108 may identify data transmission units having the header (or other control data) of predetermined type based on a MAC address of the data transmission unit, or optionally specific bits within the MAC address (e.g. destination MAC address, or source MAC address).

If the filter 108 determines that the current data transmission unit does not have said header (or other control data) of the predetermined type, it may forward the current data transmission unit to the PHY module 102 for transmission, as shown by arrow 110.

If the filter 108 determines that the current data transmission unit does have said header of the predetermined type, it may provide it to the parser module 109. The parser module 109 may in one or more embodiments provide for removal of said header of the predetermined type from the identified at least one data transmission unit. In effect, the filter 108 and the parser 109 generate a second stream of data transmission units comprising said first stream with the headers of the predetermined type removed.

Figure 2:
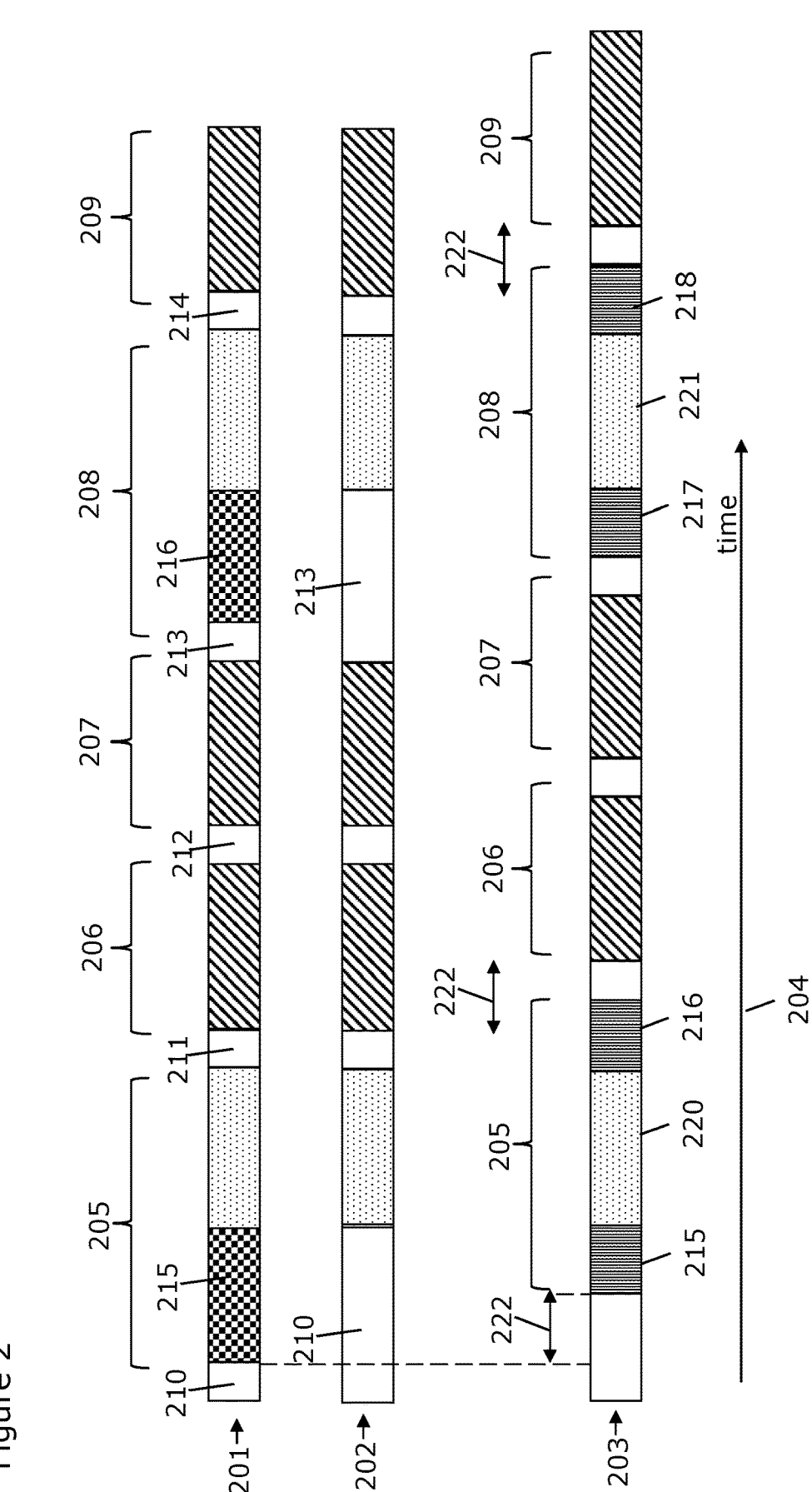
FIG. 2 shows an example data flow diagram illustrating an example stream of data transmission units at different points in said apparatus of FIG. 1.

FIG. 2 provides an example of the action of the filter module 108 and the parser module 109. FIG. 2 shows three streams of data transmission units 201, 202, 203 presented along a time axis 204. The stream 201 shows the stream of data transmission units received by the apparatus 100 at input 103. The second stream 202 shows an example of the second stream generated by the filter module 108 and parser module 109. The third stream 203 will be described later.

Thus, stream 201 comprises a plurality of data transmission units 205, 206, 207, 208, 209. Each of the data transmission units are separated by a time space, which may be known as the inter packet gap, IPG, at 210, 211, 212, 213 and 214. The IPGs 210, 211, 212, 213, 214 may have a minimum size as specified by a protocol. Thus, when the data rate of the stream 201 is high, such as at a maximum data rate, the IPGs may be at their minimum time spacing. This leaves no bit time available for addition of any further data to the data transmission units, such as protocol information described later. Even when the data rate is not at a maximum and the interpacket gaps 210-214 are not at their minimum time spacing, there may be insufficient bit time available for addition of protocol data if that protocol data itself has a minimum size. In other examples, there may be insufficient bit time available for addition of additional data transmission units to the stream 201 by the apparatus 100.

The first data transmission unit 205 and the fourth data transmission unit 208 include a header 215, 216 of the predetermined type, which may be a header of a reserved EtherType. The remainder of the first and fourth data transmission units 205, 208 comprises a data portion and may include other headers, payload and other fields. The second, third and fifth data transmission units 206, 207, 209 do not include the header of the predetermined type and may thus comprise the data portion of the frames and may include other headers, payload and other fields.

In this and one or more other examples, the first data transmission unit 205 and the fourth data transmission unit 208 are frames that are for MACSec processing and they also include the header of predetermined type. Accordingly, the second, third and fifth data transmission units 206, 207, 209 are not for MACsec processing and do not include the header of the predetermined type.

The second stream 202 shows the output of the parser module 108. The parser module 108 has removed the header of predetermined type 215 from the first data transmission unit 205. Likewise, parser module 108 has removed the header of predetermined type 216 from the fourth data transmission unit 208. In this example, this has the effect of increasing the number of idle bit-times (e.g. unused by the remaining frames) or inter-packet gap 210 and 213 that precedes the first 205 and fourth 208 data transmission units. Thus, considering data transmission unit 208, the time gap 213 between the identified data transmission unit 208 (having the header 216) and an adjacent data transmission unit 207 in the stream is increased.

It will be appreciated that although FIG. 2 shows the headers 215, 216 at the beginning of each of the data transmission units 205 and 208, the headers of predetermined type may be located elsewhere in the data transmission units.

In the present example, the header of predetermined type has a predetermined minimum size to provide sufficient bit time, in the time gaps left by the removed headers, to add additional protocol information, as will be described in more detail below. The header of predetermined type 215, 216 may be padded with data to ensure it meets the predetermined minimum size.

With reference again to FIG. 1 and FIG. 2, the apparatus 100 further comprises a protocol module 111. The parser module 109 is configured to provide the second stream 202 to the protocol module 111.

The protocol module 111 is configured to add protocol information to selected data transmission units of the second stream 202. It will be appreciated that this is made possible by the removal of the headers 215, 216 that make way for said protocol information.

Thus, the protocol module 111 is configured to receive said second stream 202 and identify, in the second stream, the data transmission units of a predetermined type. The data transmission units of a predetermined type, in this example, comprise those designated for MACsec processing. Thus, the protocol module 111, in this example, may be considered to be a security protocol module 111 because it provides a data security function in terms of one or more of authentication of the sender or integrity of data contained within the data transmission unit. However, it will be appreciated that the protocol information added by the protocol module 111 may be information other that MACsec processing-derived information.

The protocol module 111 may be configured to determine that the data transmission units are of the predetermined type by reading a MAC address (e.g. destination or source MAC address) from the data transmission unit and making reference to a look-up table. If the MAC address is found, this may indicate to the protocol module 111 that data transmission unit should be subject to MACsec processing (or other processing/addition of information in other examples). Alternatively or in addition, the protocol module 111 may be configured to determine that the data transmission units are of the predetermined type by reading a VLAN field, such as the VLAN ID field, and making reference to predetermined information that specifies the VLAN values that should be subject to MACsec processing. The look-up table, predetermined information or more generally a memory, may be configured by the controller 104 to allow the protocol module 111 to identify data transmission units that require MACsec processing. In one or more examples, the apparatus 100 may be configured to modify or overwrite the MAC address once read by the protocol module. In one or more examples, the MAC address may be overwritten with a different MAC address obtained from a look-up table or, more generally a memory, of the apparatus 100.

In this example, the data transmission units of the predetermined type that the protocol module 111 is looking for are the same data transmission units which have had their header of predetermined type removed. However, in an alternate example, the parser module 109 may be configured to remove the header of predetermined type from different data transmission units to those identified by the protocol module 111 as ones to which to add the protocol information. For example, the second data transmission unit 206 may be provided with the header of predetermined type and thereby have it removed by the parser module 109, thereby increasing the size of inter packet gap 211. The first data transmission unit 205 may be of the predetermined type to which the protocol module 111 adds the protocol information. In this alternative example, the extra time in the inter packet gap 211 allows for the increase in size of the first data transmission unit 205 by the action of the protocol module 111.

Returning to the current example, it will be appreciated that the protocol module 111 does not use the header of predetermined type to determine whether to add the protocol information (by MACSec processing of frame) because it has been removed and other indicators in what remains of the first and fourth data transmission units 205, 208 is used. However, in other examples, the header of predetermined type 215, 216 may be used, at least in part, to indicate to the protocol module 111 that the data transmission unit provided thereto is of the predetermined type. Thus, rather than refer to look-up tables, the protocol module 111 may be configured to use information read from the header of predetermined type before it was removed. In other examples, a combination of these two approaches may be used.

The protocol module 111, for data transmission units that are identified as being of the predetermined type, is configured to add protocol information. The protocol information may comprise information determined from MACsec processing, such as specifying whether the data protocol unit should be send via a controlled or uncontrolled port; or an Integrity Check Value (ICV) for the data transmission unit. The protocol module 111 may optionally encrypt the frame as per the MACSec 802.1AE standard.

With reference to FIG. 2, the third stream 203 shows the output of the protocol module 111 to the PHY module 102. The first data transmission unit 205 now includes the protocol information 215 and 216 (i.e. two different fields of protocol information) added by the protocol module 111. Likewise, the fourth data transmission unit 208 now includes the protocol information 217 and 218 added by the protocol module 111.

Thus, the apparatus 100 and, in particular, the parser module 109 being configured to remove said header 215, 216 provides time, that is bit time at the predetermined bit rate, in said second stream 202 for the addition of the protocol information 215, 216, 217, 218.

In this embodiment, the header 215 or 216 of the predetermined type has a minimum size greater than or equal to the size of the corresponding protocol information 215, 216 or 217, 218 added by the protocol module. Thus, for one or more examples, the size of the protocol information to be added by the protocol module is known. For example, in implementations of the MACsec protocol, the protocol information comprises 32 bytes. Thus, the headers 215, 216 may also be of 32 bytes to provide the required bit time. This means that the space between two frames offered by the MAC 105 must be 12+32 bytes (IPG+MACSec headroom) in some examples.

With reference also to FIG. 1, the third stream 203 is provided to the transceiver, i.e. the PHY module 102 in this example. Accordingly, the transceiver 102 receives the combination of the data transmission units that were forwarded directly from the filter 108 (because they did not have a header of the predetermined type) and the data transmission units that pass through the parser module 109 and the protocol module 111 (because they had the header of the predetermined type and were units of the predetermined type).

Providing for additional bit time by the removal of the header of predetermined type may be advantageous, particularly for the implementation of protocols that require the addition of information to the data transmission units in the apparatus 100. Addition of information in the apparatus 100 that includes the transceiver 102 may be difficult because communication between the apparatus 100 and devices that implement higher layer protocols may be limited. When the time between data transmission units 205-209 is small, there may not be enough bit time to add information.

In one or more examples, the processor 104 is configured to generate the plurality of said data transmission units or data from which the plurality of data transmission units can be generated. The processor 104 may determine which data transmission units 205, 208 are to have the protocol information added by the apparatus 100. Accordingly, the processor 104 is configured to generate, for each of the data transmission units 205, 208 of the predetermined type, at least one data transmission unit having the header of the predetermined type 215, 216 for removal by the filter. It will be appreciated that several data transmission units may be provided with the header of predetermined type (for removal) such that the sum of the size of headers is sufficient to allow for addition of the protocol information. In this way, the processor 104 can provide the apparatus 100 with data transmission units including sacrificial content that can be removed to make way for said protocol information. The data transmission units having the sacrificial header may comprise those that require the protocol information adding thereto or be directly adjacent thereto.

Thus, the apparatus 100 and the processor 104 may be configured to operate together to guarantee enough bit time in the stream provided to the apparatus 100 such that the protocol information generated by the MACsec protocol (or other protocol module 111) can be added.

In one or more examples, the apparatus 100 receives signals from the transmission medium. The signals may be received by the PHY module 102 for decoding and then data transmission units derived therefrom are forwarded to the protocol module 111. In implementations where the protocol module implements MACsec, the MACsec information in the data transmission units is processed prior to sending to the MAC 105 via receive output 106.

The apparatus 100 may comprise an integrated circuit including said transceiver module 102, filter module 108, parser module 109 and protocol module 111. The apparatus 100 may be provided in combination with an appropriately configured processor 104 and, optionally, a MAC 105. However, the apparatus 100 may alternatively be coupled with a legacy processor 104 and/or legacy MAC 105. In such an example, the apparatus 100 may be provided in combination with computer program code for execution by the processor 104 as a firmware or software update to cause it to provide the headers of predetermined type for removal by the apparatus 100 as described herein.

In the example of FIG. 2, the protocol information 215, 217 comprises a SecTag, which is an example of a security protocol header. In this example, the protocol information 216 and 218 also comprises an Integrity Check Value, which is an example of security protocol information. The ICV 216 may be calculated based on a data portion 220 contained within the data transmission unit 205. Likewise, the ICV 218 may be calculated based on a data portion 221 contained within the data transmission unit 208. Thus, the protocol module 111, in this example, may introduce a fixed delay 222 relative to the second stream 221 due to the need for the protocol module 111 to receive the data portions 220, 221 in full in order to calculate the ICV.

In the one or more examples above, the protocol module 111 implements MACSec and thus the protocol information added to the data transmission units comprises that determined by MACsec processing. However, in other examples, the protocol module 111 may be configured to add IEEE802.1CB header data comprising an IEEE 802.1CB EtherType and sequence number, such as specified in IEEE 802.1CB-2017-Frame Replication and Elimination for Reliability. In a still further example, the protocol module 111 may be configured to add the IEEE 1722 AVB Transport protocol information. In such an example, the protocol module 111 may be configured to add protocol information such as CAN, LIN or other data or designations.

In one or more examples, the transceiver 102 is configured to output signals to the transmission medium 101 representative of said data transmission units 205-209 of the third stream 203 which, as described above, corresponds to second stream 202 with the protocol information 215-218 added.

In the example described above, the header of predetermined type is sacrificial and is removed to provide the required bit time. However, in other examples, the header of predetermined type may be additionally used by the processor 104 to provide instructions to one or more of the components 108, 109, 111 of the apparatus 100.

Thus, in one or more examples, the apparatus 100 or, more particularly, the parser module 109, is configured to read information (such as control information for control of the apparatus 100) from the header of the predetermined type prior to its removal, and, based on said information, provide for control of the protocol module 111. This may be advantageous in some examples because the processor 104 may be able to instruct the protocol module 111 (a MACSec engine in this example) to process the corresponding data transmission unit or plurality of data transmission units in a certain way. Thus, the protocol module 111 may be controlled in terms of the protocol information added to the at least one data transmission unit of the predetermined type.

Figure 3:
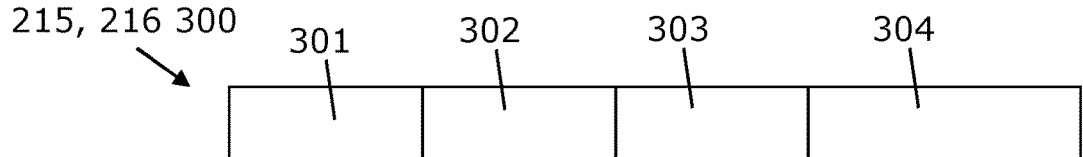
FIG. 3 shows an example of control data comprising a header of predetermined type.

FIG. 3 shows an example of the header 300 of predetermined type (also numbered 215, 216 in FIG. 2). The header 300 includes a first field 301 to enable the filter 108 to identify it. In this example, the first field comprises a designation of an EtherType that may be reserved for implementation of the present examples. The second field 302 and third field 303 may include information provided by the processor 104. In this example, the second field 302 may specify whether the protocol module 111 should send the data transmission unit via a controlled port or via an uncontrolled port. In this example, the third field 303 may specify whether the protocol module 111 should use a secure channel or not or identify by a secure channel identifier which of a plurality of secure channels to use. It will be appreciated that one, two, three, four or any other number of field containing information from the processor 104 may be provided. Further, the information need not be MACsec related information given that the present disclosure covers embodiments wherein the protocol module 111 adds protocol information other than MACsec related information. The fourth field 304 may provide further information. However, in this example, the fourth field 304 is padded with bits to ensure that the header 300 is of a predetermined minimum length such that there is sufficient bit time available for the protocol information to be added by the protocol module 111. If the bit time required for the protocol information is fixed or known to the processor 104, the size of the header 300 may be variable (i.e. controlled by the processor 104) based on the inter packet gap such that bit time available between successive data transmission units, when accounting for the header 300 and the size of the inter packet gap, is sufficient for the protocol information to be added.

The parser module 109 may be configured to provide the second stream 202 via a first logical output 112 to the protocol module 111. The information read from the header 300 may be provided to the protocol module via a second logical output 113. In some examples, two different terminals are provided between the parser module 109 and the protocol module 111 to provide for said first logical output 112 and said second logical output 113.

As discussed, the present examples may have advantages when said stream comprises said data transmission units each having a time gap therebetween that is less than that required to add the protocol information 215, 216 and 217, 218 at a data rate corresponding to a data rate used to encode the data transmission units. In some examples, the apparatus 100 and processor 104 may be configured selectively operate as described (by providing the header 215 and subsequent removal by the apparatus 100) only at times the time space 210-214 between consecutive data transmission units is less than a predetermined time corresponding to the bit time required to add the protocol information (and the minimum inter packet gap).

Further, in one or more examples, the apparatus 100, in providing the above described functionality may allow for constant latency processing, which, in turn, may allow for implementation of MACsec alongside Time-Sensitive Networking, TSN, or Audio Video Bridging, AVB.

It will be appreciated that removal of the header of predetermined type and/or addition of protocol information may alter the data transmission unit such that any error checking or error correction data, such as a frame check sequence or CRC, would be invalid. Accordingly, the apparatus 100 may be configured to calculate and update error checking/error correction data, such as FCS/CRC, in the data transmission unit at least after removal of the header of predetermined type.

One or more of the examples presented herein describe the use of a sacrificial header of predetermined type. However, the header of predetermined type is one example of the control data of predetermined type. Thus, control data of a predetermined type may be provided by the processor 104 that is sacrificial and is removed by the parser module 109 to make time for the addition of protocol information. In one or more examples, which may or may not be provided in combination with said header of predetermined type, the processor 104 may be configured to provide one or more data transmission units with empty padding (an example of control data) in a designated part of the data transmission unit. The filter module 108 may therefore identify the data transmission units having empty padding and provide them to the parser module 109 for removal. In a further example, the processor 104 may be configured to add padding to every data transmission unit. In such an example, the filter module 108 acts as a forwarder to pass the data transmission units to the parser module 109 for removal of the padding.

With reference to FIG. 3, it will be appreciated that header 300 (or other control data) may include information provided by the processor 104 that is specific to the protocol implemented by the protocol module 111. Thus, the second field 302 and optional the third field 303 (or more fields) may include information to instruct the protocol module 111 regarding implementation of IEEE 802.1CB or IEEE 1722 AVB protocols.

In the examples described, the filter module 108, the parser module 109, the protocol module 111, and the PHY module 102 are shown as discrete "blocks" but it will be appreciated that the blocks are provided to show the functions of the apparatus 100 and the physical layout of the apparatus may or may not include such a separation of functionality. For example, in one or more examples, physical components may be provided to perform one or more of the filtering, parsing and adding of the protocol information functions. However, in other examples, a processor (not shown) may be provided and one or more of the functions provided by the filter module, parser module and protocol module may be provided by software executed by the processor. In other examples the apparatus 100 may be embodied as a combination of software executed by one or more processors and appropriately configured hardware. It will be appreciated that by processor it is intended to include any processing entity such as a general purpose processor, FPGA, programmable logic controller or appropriately configured hardware.

Figure 4:
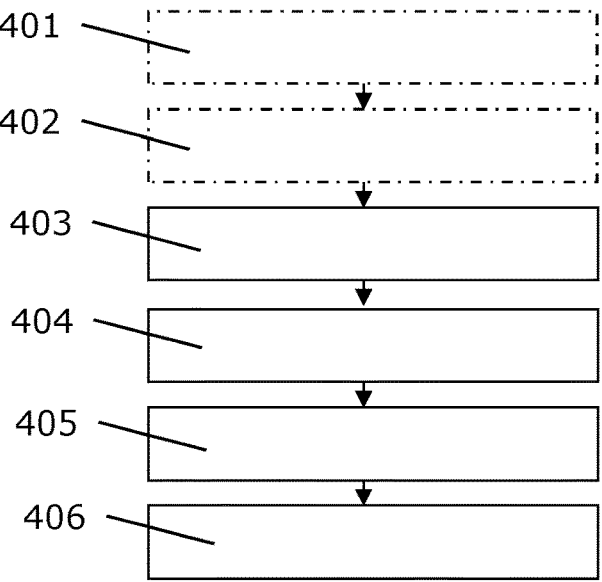
FIG. 4 shows a flow chart illustrating an example method; and e.

Example FIG. 4 Shows a Method Comprising a. receiving 403, at an input, a stream comprising a plurality of data transmission units;

b. identifying 404, by a filter, at least one data transmission unit in the stream having a header (or control data) of a predetermined type and removing said header of the predetermined type from the identified at least one data transmission unit and thereby generating a second stream of data transmission units comprising said first stream with the headers of the predetermined type removed;

c. receiving 405 said second stream, by a protocol module, and identifying, in the second stream, at least one data transmission unit of a predetermined type and adding protocol information to the at least one data transmission unit of the predetermined type; and d. wherein removing of said header of the predetermined type from said identified at least one data transmission unit provides time in said second stream for the addition of the protocol information; and e. outputting 406, by a transceiver, signals representative of said data transmission units of the second stream, with said protocol information added, to a transmission medium.

The method may include, prior to said receiving step 403:

a. generating 401, by a processor, a plurality of said data transmission units for the stream, wherein for each of the data transmission units of the predetermined type, at least one data transmission unit having the header (or control data) of the predetermined type is generated for subsequent removal by the filter; and b. providing 402 said plurality of said data transmission units to a media access controller for adding information to said data transmission units before providing the stream of data transmission units for the apparatus.

Figure 5:
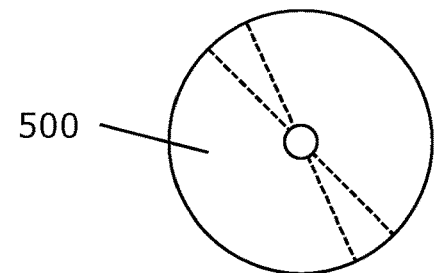
FIG. 5 shows an example computer readable medium comprising computer program code for implementing the method of FIG. 3, in part or in full.

Example FIG. 5 shows a computer readable medium 500 which includes computer program code for implementing steps 401 and 402 at the processor 104. In other examples, the computer program code may be configured to provide for steps 403 to 406 at the apparatus 100.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services.

As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising:
an input for receiving a stream comprising a plurality of data transmission units;
a filter configured to identify, in the stream, at least one data transmission unit having control data of a predetermined type and wherein said apparatus is configured to at least remove said control data of the predetermined type from the identified at least one data transmission unit to increase an idle time between packets of the stream and thereby generate a second stream of data transmission units comprising said first stream with the control data of the predetermined type removed;
a protocol module configured to receive said second stream from the parser and identify, in the second stream, at least one data transmission unit of a predetermined type and add protocol information to ends of the at least one data transmission unit of the predetermined type; and
wherein the apparatus being configured to remove said control data of the predetermined type from said identified at least one data transmission unit provides time in said second stream for the addition of the protocol information; and
wherein the apparatus includes a transceiver configured to output signals representative of said data transmission units of the second stream with said protocol information added to a transmission medium.

2. The apparatus of claim 1, wherein said control data of predetermined type comprises a header of predetermined type.

3. The apparatus of claim 1, wherein said apparatus is configured to remove said control data of the predetermined type from the identified at least one data transmission unit and increase a time gap between the identified at least one data transmission unit and an adjacent data transmission unit in the stream.

4. The apparatus of claim 1, wherein the apparatus is configured to read information from the control data of the predetermined type prior to its removal, and provide said information to the protocol module, wherein said protocol module is configured to one or both of: use the information to determine the protocol information added to the at least one data transmission unit of the predetermined type; and identify the data transmission unit of the predetermined type.

5. The apparatus of claim 1, wherein the control data of the predetermined type has a minimum size greater than or equal to the size of the protocol information added by the protocol module.

6. The apparatus of claim 1, wherein the at least one data transmission unit of the predetermined type comprises said at least one data transmission unit from which the apparatus has removed the control data of the predetermined type.

7. The apparatus of claim 1, wherein said protocol module comprises a security protocol module and said protocol information added to the data transmission unit of the second predetermined type comprises security protocol information.

8. The apparatus of claim 7 wherein, said protocol module is configured to implement, at least in part, the MACSec security protocol, and wherein the security protocol information comprises one or more of: a MACSec header and an integrity check value.

9. The apparatus of claim 8 wherein said the apparatus is configured to read information from the from the control data of the predetermined type prior to its removal and wherein, for control of the implementation of MACsec by the protocol module, said information comprises a specification of whether a controlled port or an uncontrolled port should be used by the protocol module.

10. The apparatus of claim 8 wherein said the apparatus is configured to read information from the from the control data of the predetermined type prior to its removal and wherein, for control of the implementation of MACsec by the protocol module, said information comprises a specification of which of a plurality of secure channels to use.

11. The apparatus of claim 2 wherein said filter is configured to identify the header of predetermined type as such based on an EtherType field present in the data transmission unit.

12. The apparatus of claim 1 in combination with a processor, wherein:

the processor is configured to generate a plurality of said data transmission units for the stream, wherein the processor is configured to generate, for each of the data transmission units of the predetermined type, at least one data transmission unit having the control data of the predetermined type for removal by the filter;

wherein the controller is configured to provide said plurality of said data transmission units to a media access controller for adding information to said data transmission units before providing the stream of data transmission units for the apparatus.

13. The apparatus of claim 12, wherein the media access controller is configured to receive said plurality of said data transmission units from the controller and add to said data transmission units at least one of: a preamble, a start-of-frame delimiter, a frame check sequence and at least a predetermined time-space, comprising an interpacket gap, between each data transmission unit.

14. The apparatus of claim 12, further in combination with the media access controller.

15. The apparatus of claim 1, wherein said apparatus is configured to receive data transmission units of the predetermined type followed directly in the stream by at least one data transmission unit having said control data of the predetermined type.

16. The apparatus of claim 1, wherein the apparatus comprises an integrated circuit including said transceiver module, and the processor comprises a processor configured to control a media access controller that provides the stream to the apparatus.

17. The apparatus of claim 1, wherein said filter is configured to, for data transmission units not having said control data or header of the predetermined type, provide said data transmission units to the transceiver for transmission bypassing said protocol module.

18. The apparatus of claim 1, wherein the apparatus is configured to receive the stream at a predetermined rate and the transceiver is configured to transmit said signals at the output at the predetermined rate.

19. A method comprising:

receiving, at an input, a stream comprising a plurality of data transmission units;

identifying, by a filter, at least one data transmission unit in the stream having control data of a predetermined type and removing said control data of the predetermined type from the identified at least one data transmission unit to increase an idle time between packets of the stream and thereby generating a second stream of data transmission units comprising said first stream with the control data of the predetermined type removed;

receiving said second stream, by a protocol module, and identifying, in the second stream, at least one data transmission unit of a predetermined type and adding protocol information to ends of the at least one data transmission unit of the predetermined type; and wherein removing of said control data of the predetermined type from said identified at least one data transmission unit provides time in said second stream for the addition of the protocol information; and outputting, by a transceiver, signals representative of said data transmission units of the second stream, with said protocol information added, to a transmission medium.

20. The method of claim 19, wherein the method includes, prior to said receiving by the apparatus:

generating, by a processor, a plurality of said data transmission units for the stream, wherein for each of the data transmission units of the predetermined type, at least one data transmission unit having the control data of the predetermined type is generated for subsequent removal by the filter; and providing said plurality of said data transmission units to a media access controller for adding information to said data transmission units before providing the stream of data transmission units for the apparatus.

\* \* \* \* \*